Patented Apr. 10, 1934

1,954,639

UNITED STATES PATENT OFFICE 1,954,639

COMPOUND FOR PUDDINGS AND THE METHOD OF COMPOUNDING THE INGREDIENTS THEREOF

Otto T. Lorenz, Urbana, Ohio, assignor to The W. H. Marvin Company, Urbana, Ohio, a corporation of Ohio No Drawing. Application March 7, 1932, Serial No. 597,405

6 Claims. (Cl. 99—10)

This invention relates to a compound for puddings and the method of compounding the ingredients thereof.

The object of my invention is to provide a pudding compound which can be packed in cartons in a comparatively dry state.

A further and more specific object of this invention is to provide a method of compounding the ingredients for a pudding such that a leavening ingredient may be mixed with the ingredients before packing in cartons in such a way that the danger of the leavening ingredient becoming active in the compounding is obviated.

A further object of the invention is to provide a method of compounding the ingredients of the pudding such that the ingredients will be preserved until used.

The ingredients forming the compound consist essentially of fruit, sugar, flour, nuts, leavening material, preferably in the form of baking powder, a substance which will act as a carrier for the baking powder and also act as a separator for the particles of the various ingredients in the nature of an inert flaky material such as bran, and preferably a small quantity of salt.

The proportions of the ingredients are substantially as follows:

| | Percent |
|---|---|
| Fruit | 51.22 |
| Sugar | 23 |
| Flour | 15 |
| Nuts | 8.9 |
| Baking powder | .3 |
| Bran | 1.28 |
| Salt | .3 |

In compounding the ingredients, the fruit and nuts, after being reduced to a comparatively fine state, are thoroughly mixed with ordinary wheat flour and sugar in substantially the proportions stated so that the flour and sugar will absorb the moisture of the fruit and will thoroughly coat the fruit particles as well as the nuts, the mixing being sufficient to render the compound in a comparatively dry state. The sugar combined with the moisture of the fruit acts as a preservative for the fruit and nuts. A small quantity of salt is preferably mixed with the ingredients.

After the ingredients have been thus combined and thoroughly mixed to a comparatively dry state, the leavening material, preferably in the form of baking powder, is added. The baking powder, however, is first thoroughly mixed with the bran so that the bran will act as a carrier for the baking powder in order that the baking powder may be more uniformly distributed throughout the compound. The bran being of an inert flaky character also acts as a separator for the particles of the compound so that in preparing the pudding the compound may be easily disintegrated or crumbled.

At the time the baking powder and bran are added to the compound, the compound is in a sufficiently dry state to obviate the danger of the baking powder becoming active.

While I prefer to use bran as a carrying agent for the leavening material and as a separator for the particles of the ingredients of the compound, yet some other material of an inert flaky nature may be found effective and I do not desire to be limited therefore to bran for the stated purpose.

A feature of importance in connection with the compounding of a pudding of this character is the manner in which the fruit is comminuted. The inner or juicy portion of the fruit should be subjected in an effective way to the action of the flour and sugar in order that the juices may be absorbed as quickly as possible, and it is also desirable that the fruit be reduced in a way which will leave the fruit particles visible in the resulting compound rather than having it in a finely ground condition. In order to accomplish this effectively, the fruit is sliced in the form of cross-sections to a thickness of about one-eighth of an inch which leaves the inner or juicy portion of the fruit effectively exposed to the action of the flour and sugar save for the narrow band of skin which surrounds the cross-section.

The compound thus prepared is packed in paper cartons, an inner wrapper of wax paper being used to hermetically seal the package and exclude moisture.

The fruit which is used may be dates for a date pudding, figs for a fig pudding, or raisins, currants and citron for a plum pudding.

A pudding thus compounded may be quickly and easily prepared for baking. It is usual to pack the compound in cartons of a net weight of seven ounces. In preparing a pudding, the contents of a package of that weight, after being crumbled, are thoroughly mixed with a well beaten egg flavored with vanilla or the like. The paste is then placed in a greased pan and baked slowly at a temperature of about 275° Fahrenheit for thirty or thirty-five minutes directly over water or with a pan of water in the bottom of the oven. The pudding may be served with whipped cream, hard sauce, or the like.

Having thus described my invention, I claim:

1. The method of compounding a pudding consisting in coating a quantity of individual fruit bodies of a size to be visible in the resulting compound with a quantity of flour considerably less in proportion than the quantity of fruit and also with sugar mixed with the flour in a suitable proportion to sweeten and preserve the mixture, until the fruit bodies are thoroughly covered with the flour and sugar, and thereafter mixing a leavening material with the fruit, flour and sugar.

2. A pudding compound consisting of a quantity of individual fruit bodies of a size to be visible in the finished compound, a quantity of flour of considerably less proporton than the quantity of fruit, sugar in a suitable quantity for sweetening and preservative purposes, the fruit bodies, flour and sugar being thoroughly mixed to thoroughly coat the fruit bodies with the flour and sugar, and leavening material mixed with the other ingredients after the fruit has been coated with the flour and sugar.

3. The method of compounding a pudding material concentrate consisting in initially coating the cut surfaces of moist fruit portions with flour and sugar to preserve the fruit, absorb excess moisture and to seal the cut surfaces against escape of moisture and thereafter intermixing therewith a leavening agent.

4. A pudding compound including cut portions of moist fruit, a sealing coating of flour applied to the cut surfaces of the moist fruit for absorbing and confining the moisture thereof and a leavening material protected from the moisture of the fruit by said sealing coating.

5. A pudding compound including cut portions of moist fruit of appreciable size, a sealing coating for the moist cut surfaces thereof comprising a mixture of sugar and cereal flour, and an intermixture of bran and baking powder between the surface coated portions of moist fruit.

6. A food product comprising an intermixture of approximately fifty percent cut portions of moist fruit of appreciable size, approximately twenty-five percent sugar, approximately fifteen percent cereal flour, and a leavening material.

OTTO T. LORENZ.